UNITED STATES PATENT OFFICE.

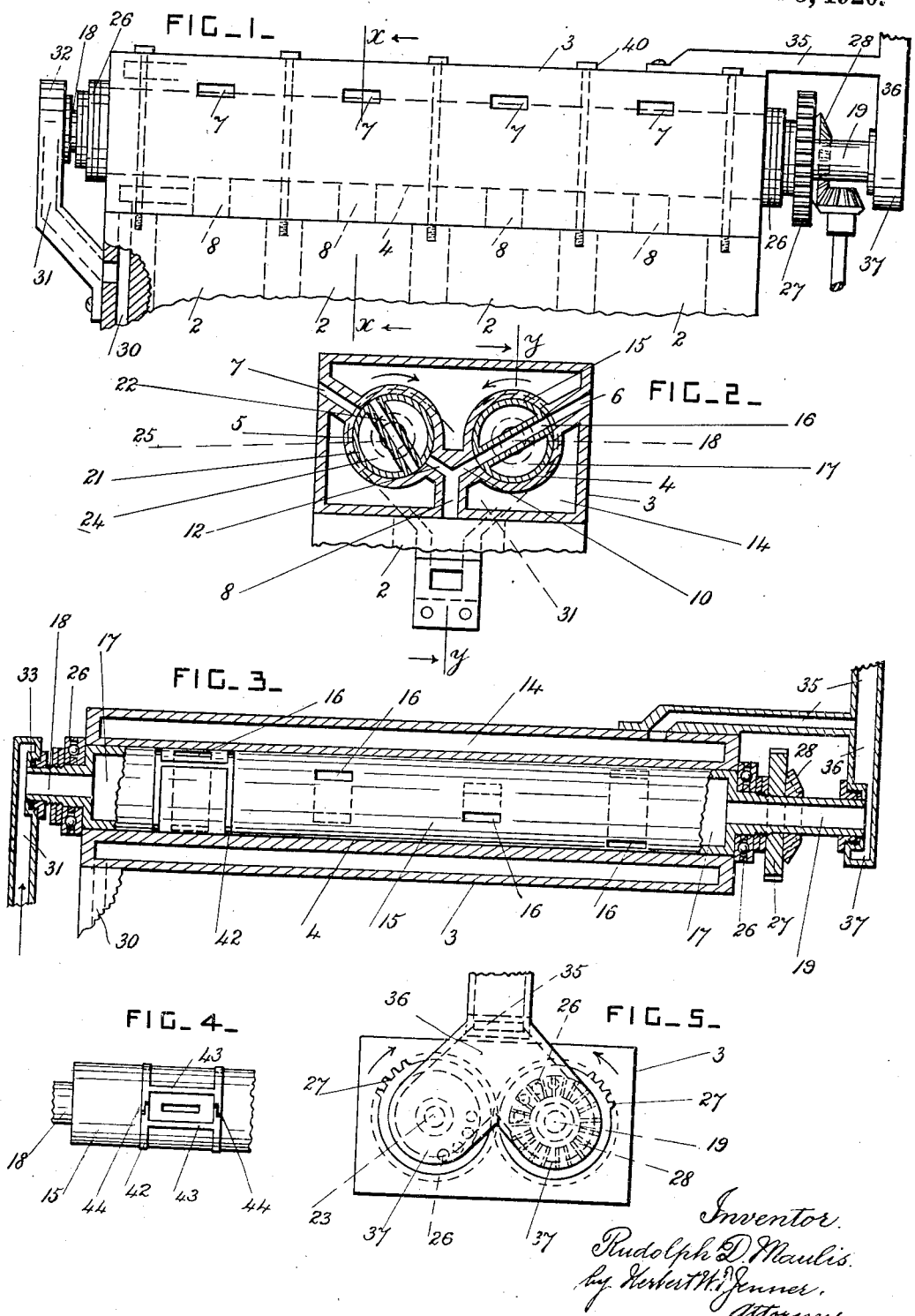

RUDOLPH D. MAULIS, OF STERLING, NEBRASKA.

INTERNAL-COMBUSTION ENGINE.

1,354,772.   Specification of Letters Patent.   Patented Oct. 5, 1920.

Application filed April 5, 1919. Serial No. 287,865.

*To all whom it may concern:*

Be it known that I, RUDOLPH D. MAULIS, a citizen of the United States, residing at Sterling, in the county of Johnson and State of Nebraska, have invented certain new and useful Improvements in Internal-Combustion Engines, of which the following is a specification.

This invention relates to internal combustion engines having a series of power cylinders arranged side by side and provided with inlet and exhaust valves which are common to all the cylinders; and it consists in the novel construction and combination of the parts hereinafter fully described and claimed whereby the inlet and exhaust is effected, and whereby the valves and their casing are kept cool.

In the drawings, Figure 1 is a front view of a portion of an engine constructed according to this invention. Fig. 2 is a cross-section through the valves, taken on the line $x$—$x$ in Fig. 1. Fig. 3 is a longitudinal section through the inlet valve, taken on the line $y$—$y$ in Fig. 2. Fig. 4 is a front view of a packing ring. Fig. 5 is an end view of one end portion of the valve casing.

In the engine illustrated four power cylinders 2 are provided, and are arranged side by side. These cylinders are provided with pistons which are operatively connected with a crankshaft in any approved manner, and the casing, and the general construction of the various necessary parts which are not shown in the drawings, is of any approved sort.

A valve casing 3 is secured to the power cylinders, and is provided with two cylindrical valve chambers 4 and 5 arranged side by side. The inlet valve chamber 4 has a series of ports 6 on one side of the casing 3 which are connected to the inlet manifold, which is not shown. The exhaust valve chamber 5 has a similar series of ports 7, on the other side of the casing 3, for connecting it with the exhaust manifold, which also is not shown.

The lower side of the valve casing 3 has a series of vertical passages 8 arranged over the centers of the power cylinders, and these passages 8 have forked branch passages 10 and 12 at their upper ends which connect them with the valve chambers 4 and 5, and which are arranged in line with the ports 6 and 7 respectively.

The valve casing is provided with a water space 14 which extends around and between the cylindrical valve chambers. Water is circulated through this space in order to keep the valve casing cool.

A cylindrical inlet valve 15 is journaled in the valve chamber 4, and is provided with a series of tubular passages 16 arranged crosswise of it at suitable distances apart, and spaced suitably around the periphery of the valve. These passages 16 connect the inlet ports 6 with the passages 10, one after another as the inlet valve is revolved. Each passage 16 is adapted to connect a port 6 with a passage 10 twice in each revolution of the valve.

The inlet valve has a water space 17 between and around the cross passages 16, and it has also a water inlet pipe 18 at one end and a water outlet pipe 19 at the other end. These pipes 18 and 19 are arranged on the axis of the valve, and antifriction bearings 26, such as ball-bearings, are secured to the valve casing for the ends of the inlet valve, around the water pipes, to run against. The cylindrical exhaust valve 21 is journaled in the valve chamber 5, and is provided with a series of tubular passages 22 arranged crosswise of it and spaced apart in a similar manner to the inlet passages 16, and connecting the passages 12 with the exhaust ports 7.

The exhaust valve has a water space 24 which communicates with a water inlet pipe 25 at one end of the valve and a water outlet pipe 23 at its other end. An antifriction bearing 26 is secured to the casing for the respective ends of the exhaust valve to run against, and these bearings are similar to those of the inlet valve. The inlet and exhaust valves are connected together by a pair of intercurrent toothed wheels 27, so that they revolve simultaneously, and the valves are revolved by means of a driving wheel 28 secured to one of them, and operatively connected with the engine crankshaft in any approved way, so that the valves are revolved at a suitably reduced speed, same being one-fourth that of the crankshaft.

The water space of the valve casing is provided with a water inlet pipe or member 30, which may also be connected with the water jackets of the power cylinders, if desired. This inlet pipe 30 is provided with a forked branch pipe 31 which is connected to it at one end, and which has its forked end 32 connected to the water inlet pipes 18 and 25 of the inlet and exhaust valves. Packing boxes 33 are provided at the junction of these pipes so that the inlet pipes 18 and 25 may be revolved without leak.

The water space of the valve casing is also provided with a water outlet pipe or member 35, and this pipe 35 has a forked branch outlet pipe 36 having its branches 37 connected to the water outlet pipes 19 and 23 of the inlet and exhaust valves. The cooling water is circulated continuously through the water spaces of the two valves and their casing by any approved means.

The valve casing is secured to the ends of the power cylinders by any suitable bolts or screws 40, and it forms a cover which is common to all the cylinders, and which provides each power cylinder with a single passage 8 for inlet and exhaust which is arranged vertically and on its axis, so that the distribution of the charge and the disposal of the products of combustion are effected to the best advantage. The upper end portions of the cylinders form their combustion chambers, and when the valve casing 3 is removed access can be had to the combustion chambers and cylinders for the purpose of removing deposits of carbon. The water space 14 of the valve casing extends around and between the chambers 4 and 5 to the sides of the tubular passages 8 and the ports 6, 7, 10 and 12, so that the valves and their chambers are cooled as much as possible, and the valves are arranged relatively near together so that they can be connected by intercurrent toothed wheels.

As the ports and passages of the valve cylinders are in line with each other, and the passages of the valves extend between them, each valve passage connects the port and passage pertaining to it twice during each revolution of the valve, and each valve only has to be revolved once to each four revolutions of the crankshaft, so that the wear of the valves is greatly reduced.

The valve cylinders are preferably provided with expansion rings or packing rings 42, as shown in Fig. 4. These rings are let into grooves in the valve cylinders, and they have crossbars 43 which extend between the rings which are arranged in pairs, and which have suitable overlapping joints 44. Only one pair of rings is shown in Fig. 3, but all the ports may have rings and crossbars in a similar manner.

What I claim is:

1. The combination, with a series of power cylinders provided with combustion chambers, of a removable valve casing forming a cover for the combustion chambers, said valve casing having two valve chambers and diagonally arranged upper and lower ports on opposite sides of the valve chambers, said valve casing having also a cooling chamber which extends around the valve chambers, said valve casing having also tubular vertical passages one of which is connected to each pair of lower ports and in line with the axis of the power cylinder to which they pertain, and rotary valves journaled in the valve chambers and provided with cross-passages for connecting the upper and lower ports of the valve casing at suitable intervals.

2. The combination, with a series of power cylinders provided with combustion chambers, of a removable valve casing forming a cover for the combustion chambers, said valve casing having two valve chambers and diagonally arranged upper and lower ports on opposite sides of the valve chambers, said valve casing having also vertical passages one of which is connected to each pair of lower ports and arranged axially in line with the power cylinder to which they pertain, said valve casing having also a cooling chamber which extends around the said valve chambers and their said ports and passages, rotary valves journaled in the valve chambers and provided with cooling chambers and tubular cross-passages extending across their cooling chambers and adapted to connect the upper and lower ports of the valve casing at suitable intervals, and means for circulating cooling fluid through the cooling chambers of the said valves and their casing.

In testimony whereof I have affixed my signature.

RUDOLPH D. MAULIS.